United States Patent [19]
Zhuang et al.

[11] Patent Number: 6,106,067
[45] Date of Patent: Aug. 22, 2000

[54] SEAT ADJUSTMENT AND DUMPING MECHANISM WITH MEMORY ADJUSTMENT COORDINATED WITH SEAT POSITIONING

[75] Inventors: Jim Zhuang, Northville, Mich.; James Eaton; Greg Lawhead, both of Carmel, Ind.; James V. Parrinello, Royal Oak, Mich.

[73] Assignee: P.L. Porter Co., Woodland Hills, Calif.

[21] Appl. No.: 09/230,964

[22] PCT Filed: Jul. 25, 1997

[86] PCT No.: PCT/US97/13202

§ 371 Date: Aug. 16, 1999

§ 102(e) Date: Aug. 16, 1999

[87] PCT Pub. No.: WO98/04432

PCT Pub. Date: Feb. 5, 1998

Related U.S. Application Data

[63] Continuation-in-part of application No. 08/686,251, Jul. 25, 1996, Pat. No. 5,806,932.

[51] Int. Cl.[7] .................................................. B60N 2/20
[52] U.S. Cl. ...................... 297/361.1; 297/367; 297/369; 297/378.12
[58] Field of Search .................................... 297/367, 369, 297/378.12, 361.1

[56] References Cited

U.S. PATENT DOCUMENTS

| | | |
|---|---|---|
| 4,502,730 | 3/1985 | Kazaoka et al. ................... 297/367 X |
| 4,660,886 | 4/1987 | Terada et al. ............................ 297/367 |
| 4,685,736 | 8/1987 | Tanaka et al. ....................... 297/367 X |
| 5,433,507 | 7/1995 | Chang ...................................... 297/367 |
| 5,806,932 | 9/1998 | Zhuang ................................. 297/361.1 |

*Primary Examiner*—Peter M. Cuomo
*Assistant Examiner*—Rodney B. White
*Attorney, Agent, or Firm*—Oppenheimer Wolff & Donnelly

[57] ABSTRACT

The system (10) controls reclining and dumping of a seat and the return of the seat back to its upright position depending on the position of the seat. The system (10) has a master unit (6) and a slave unit (8). The master unit (6) has a base plate (12) that attaches to a seat and pivots with respect to the ground. A master lock (90), which attaches to the base plate (12), allows the base plate (12) to pivot only when the lock (90) is unlocked. A master seat plate (70) connected to the seat pivots on the master base plate (12). A memory latch (120) normally secures the base and seat plates together so that pivoting the master plate (12) pivots the seat plate (70) except when the memory latch is not latched. A slave-side mechanical lock (111) connects directly to the seat back, which allows the seat back and the master base plate (12) to pivot only when both the master and slave locks are unlocked. An input/output device (164) unlocks the slave lock when the memory latch unlocks, which allows dumping. The input/output device (164) also unlocks the slave lock (111) when the memory latch (120) on the master lock (90) is unlocked to allow the seat back to dump. The device also permits the entire seat to slide forward when the seat back dumps. A lockout latch (290) on the memory latch (120) senses the position of the seat and prevents the seat back from returning completely to the memory position until the seat slides completely to its pre-dumped, rearward position.

11 Claims, 6 Drawing Sheets

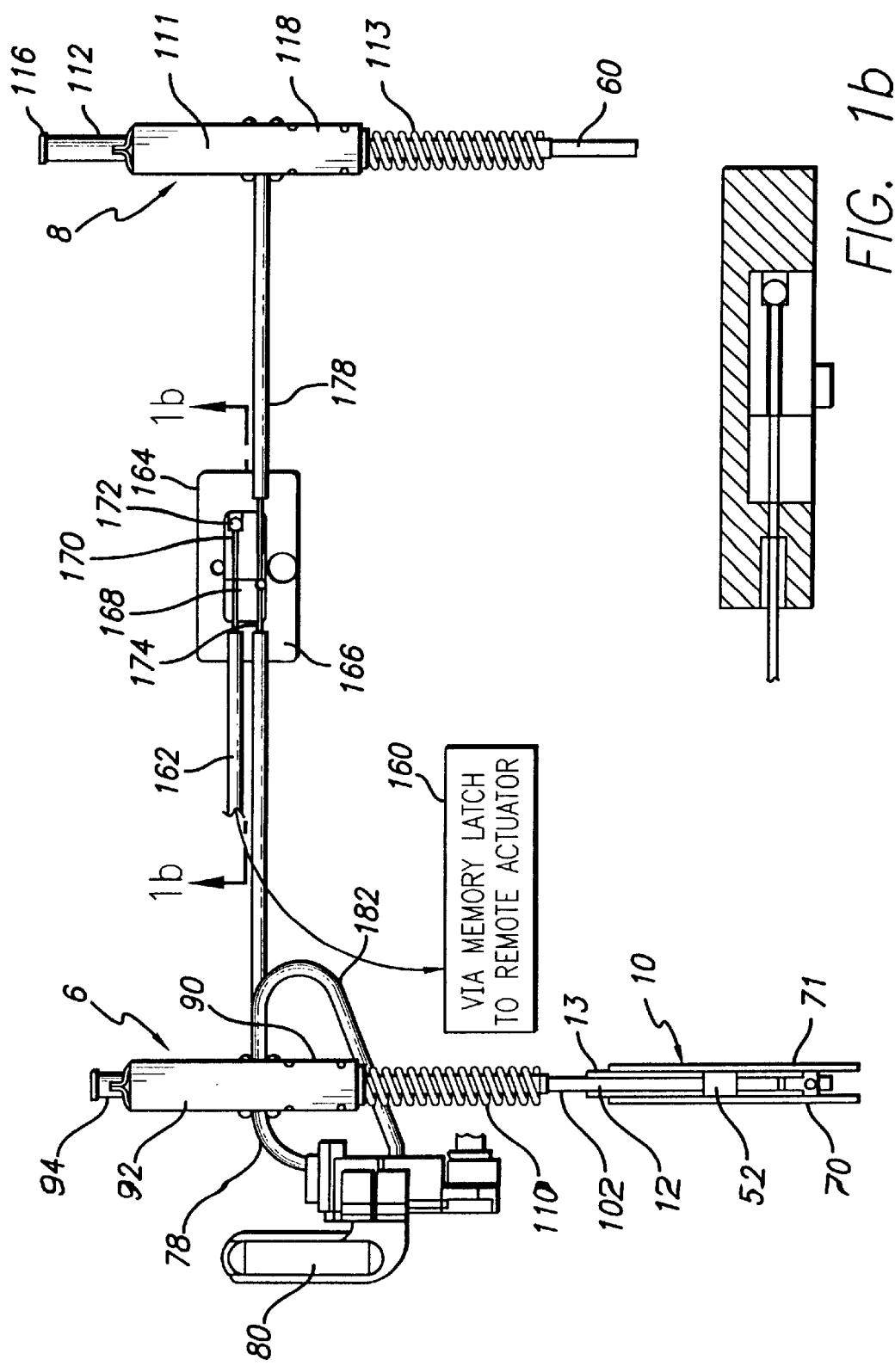

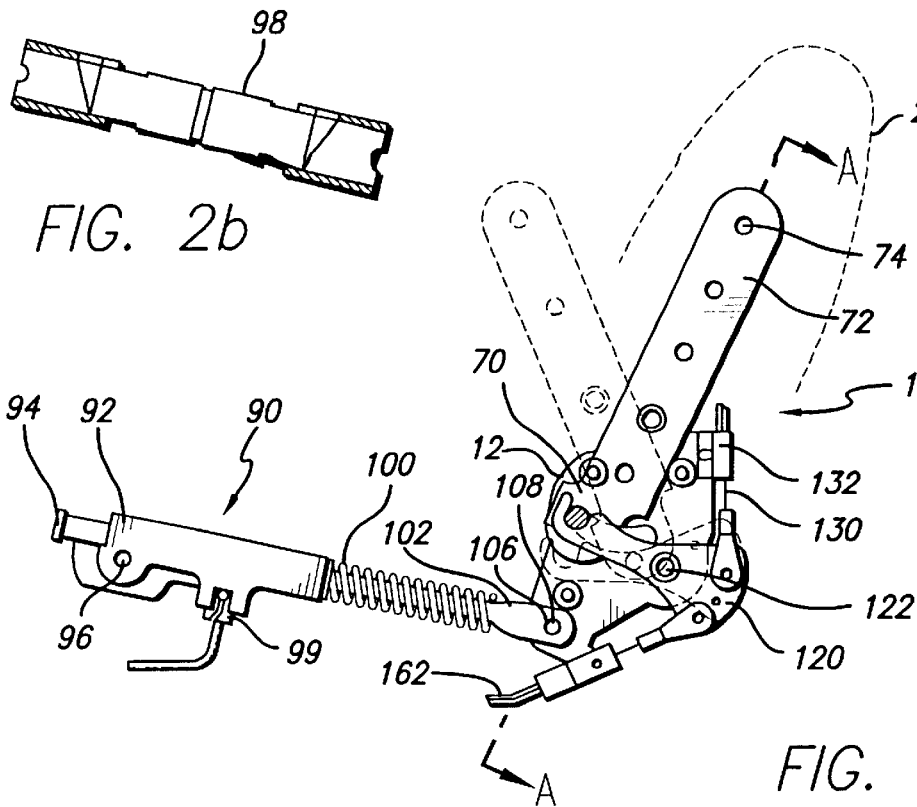
FIG. 2b
FIG. 2a
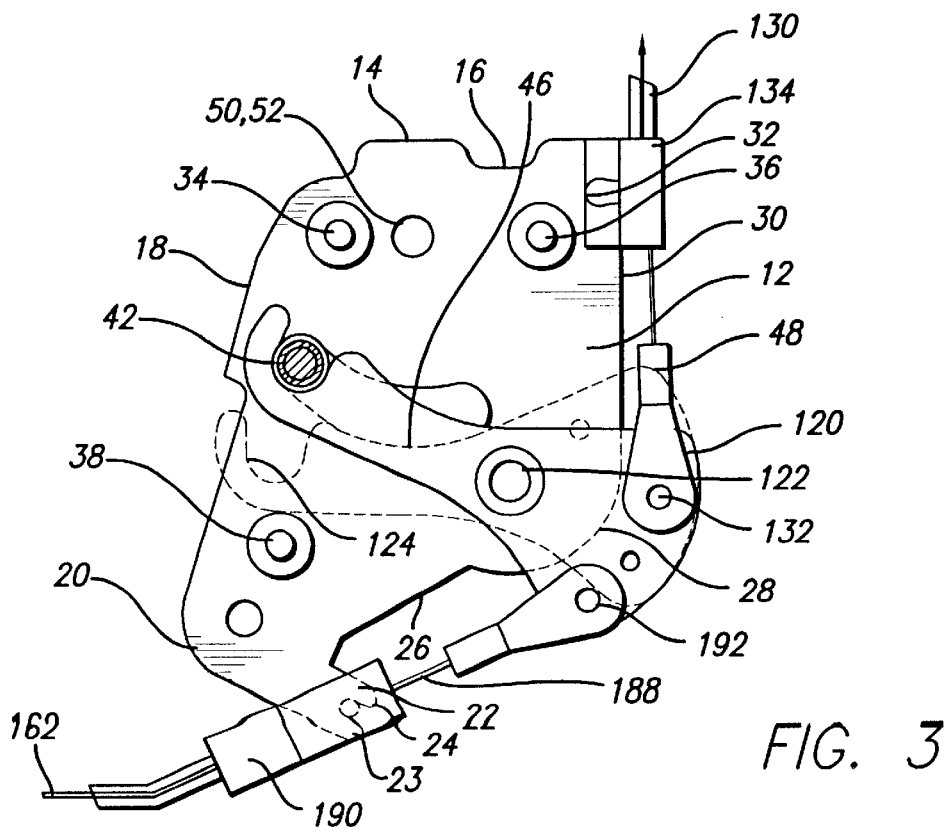
FIG. 3

SEAT ADJUSTMENT AND DUMPING MECHANISM WITH MEMORY ADJUSTMENT COORDINATED WITH SEAT POSITIONING

RELATED APPLICATION

This application is a continuation-in-part of prior U.S. patent application Ser. No. 08/686,251, filed Jul. 25, 1996, now U.S. Pat. No. 5,806,932.

BACKGROUND OF THE INVENTION

1. Field of the Invention

The present invention relates to a seat recline mechanism that includes memory. After pivoting a vehicle seat back forward to allow a passenger to enter the back seat, the seat back returns to its original, adjusted orientation. The invention also blocks locking of the seat slide mechanism when the incline returns to a memory position. This invention also relates to a system implementing the recline mechanism in vehicles.

2. State of the Art

The seat backs of the front seats in most vehicles are adjustable. The adjustment allows a person in the front seat to adjust the incline of the seat back to conform to the person's comfort. Many seats also recline back to allow one to recline.

When passengers enter the rear seat of a two-door vehicle, they must pivot the front seat forward. This is called "dumping" the front seat. Most seats have an adjustment mechanism that adjusts the seat back angle to account for the seat occupant's comfort or for reclining the seat. Many seats dump merely by releasing the seat's adjusting mechanism. Therefore, after the passenger enters the back seat, returning the seat back to the upright position just readjusts the seat back. Unfortunately, that means that each time the seat is dumped, the front seat loses its subtle adjustment. Consequently, the user must readjust the seat every time a passenger enters a two-door vehicle past that seat.

For further ease for persons entering the rear seat, some vehicles seats slide forward when they are dumped. That sliding action gives the rear seat passenger more room to enter the vehicle.

Several devices separate dumping from normal adjustments and, therefore, do not lose their adjustment when they are dumped. Thus, after dumping, the seat back returns to its adjusted position that existed immediately before dumping. The following U.S. patents teach the concept of separation of dumping from other seat adjustments: Dinkel, U.S. Pat. No. 3,887,232 (1975); Tamura, U.S. Pat. No. 3,593,069 (1976), Kazaoka, U.S. Pat. No. 4,502,730 (1985), and Terada, U.S. Pat. No. 4,660,886 (1987). These devices are quite complex with many cooperating parts. Complexity adds to cost and the chance of failure. Adding more parts also increases the weight of the mechanism, which runs counter to weight reduction strategies favored by vehicle manufacturers.

In those systems where dumping and sliding occur, those two actions must be coordinated. Most vehicle seats are spring-biased forward. Therefore, when one adjusts the seat forward or backward by releasing the lock that prevent sliding, a spring biases the seat forward. That action works well for the dumping and sliding combined movement because the seat moves forward as it dumps. Also, spring force on most seats is greater than the spring bias force on the dumped seat back. Therefore, when the user returns the seat back to the upright position, the force he or she applies to the seat back often does not slide the seat backward until the seat back locks in an upright position.

When dumping and sliding work together, the system should lock the seat back and slide lock when the seat back returns to its memorized, upright orientation. After returning the seat back to its proper position, the entire seat either may lock too far forward or may not lock. If the seat is not locked from sliding, the seat's occupant may not know that fact. Consequently, in a sudden stop, the unlocked seat may move forward to carry the occupant with the seat. If, instead, the slide locks the seat too far forward, the user must release the slide lock and position the seat to a comfortable position. Having to readjust the seat position make memory for the seat back less attractive. If the seat locks forward, the user will have to make some adjustment to the seat every time the seat dumps.

INVENTION SUMMARY

The principal objects of the present invention are to disclose and provide a less complex memory seat adjustment and dumping mechanism. Another object is to disclose and provide a mechanism that can be made lighter than other seat mechanisms. Another object is to disclose and provide a memory seat adjustment and dumping mechanism in a system that can use a master unit and a slave unit for one seat as a way to eliminate redundant parts. A further object is to use a strong mechanical lock for the memory seat adjustment and dumping mechanism and to have parts of the mechanical lock cooperate with the memory function.

Another object of the present invention is the coordination of the dumping and sliding functions. In that regard, it is an object of the present invention to prevent the seat back from reaching its memorized position and interfering with the seat sliding back to its position.

The present invention's system for controlling the orientation of a seat back and for dumping the seat back has a master unit and a slave unit. These normally mount on opposite sides of a vehicle seat. The master unit has a base plate (two parallel, attached base plates in one embodiment) attachable to a seat. The base plate also connects to the seat back via the upper arm of a seat plate. The slave-side unit consists of a mechanical lock directly connected to the seat back. The master base plates and slave-side of the seat back pivot together about a common axis with respect to the vehicle.

A master mechanical lock attaches to the master base plate and the slave-side mechanical lock attaches to the seat back. A control subsystem coordinates operation of the locks. It simultaneously locks or unlocks both the master and the slave mechanical locks to perform the reline function. The control subsystem also connects with the dumping mechanism and the slave lock. When the control subsystem is in its closed or locked condition, the slave lock and the dumping mechanism are locked. They prevent the seat plate and the seat back from pivoting. Thus, the seat back's orientation is fixed. When the control subsystem is in its opened or unlocked condition, the seat plate and the slave-side of the seat back can pivot to adjust the seat back to the dumped position.

The mechanical locks are conventional. Each lock has a housing and a rod that translates in the housing. Coil springs in the housing surround the rod. Each coil spring has a normal inside diameter that is less than the rod's outside diameter so that the springs grip the rod. To release the lock, a handle, which contacts the springs, unwinds the springs enough to increase their inside diameter so that they release the rod. A strong compression return spring biases the rod out of the housing. Because the slave-side mechanical lock's rod attaches to the slave-side of the seat back, the lock's return springs applies a bias through the rod to the seat back.

A seat plate pivots on the master base plates and connects to the seat back. When the seat back is dumped, the master seat plate pivots with respect to the master base plates. The slave side of the seat back merely pivots.

The master base plate has an arcuate slot with first and second ends. A slide pin slides within the arcuate slot. A memory latch mounts on the master base plate such that it can pivot between a latched and unlatched position. The memory latch has a latch slot that captures the slide pin when the latch is in its latched position and the slide pin is in the first end of the arcuate slot. Because the slide pin is fixed to the seat plate, the latch in its latched position prevents the seat plate from pivoting about the base plate. When the control subsystem remotely unlatches the latch, the latch releases the slide pin allowing the pin to travel in the arcuate slot. That permits the seat plate to pivot with respect to the base plate, which allows the seat to dump. Because the control subsystem also opens the slave-side lock, the return spring, which biases the rod out of the slave mechanical lock housing, helps dump the seat back forward.

The present invention has a double input/single output device ("DISO") as part of the control and actuator system. The control subsystem connects to the master lock directly and to the slave-side lock via the DISO. When a main actuator unlocks both the master- and slave-side locks, one can adjust the seat back. The control subsystem connects to the latch directly and to the slave-side lock via the latch and the DISO. Unlatching the latch of the master side also unlocks the slave lock, but the master lock remains locked when the latch is unlatched. Consequently, when the master seat plate pivots on the master base plate during dumping, the slave side of the seat back pivots. The master base plate remains stationary, however.

As the seat back returns to the position before being dumped, the latch recaptures the slide pin of the seat plate. The geometry of the slide pin and latch holds the latch rotated to its unlatched orientation until the slide pin is at the end of its slot. This only occurs when the seat back fully returns from the dumped position. When the latch does recapture the slide pin, the latch affects the DISO—to cause it to lock the slave mechanical lock.

In those systems in which dumping and sliding are coordinated, the system includes an additional lockout latch mounted on the previously-mentioned memory latch. Once the seat is dumped the lockout latch keeps the seat in a dumped position until the user slides the seat near its relock position when the lockout latch is actuated and the slave unit is unlocked. The lockout latch moves out of the way of the swing or slide pin as it travels in the arcuate slot in the master seat plate. The slide pin also moves in a slot on the lockout latch. As the seat back is returned to its upright position and the slide pin begins to move within the arcuate slot and the slot on the lockout latch, it engages a tooth or other locking member which traps the swing pin. The tooth prevents the seat back to move completely to its memorized or upright position. When the seat back stops pivoting, any force on the seat back transfers to the rest of the seat, which causes the entire seat to slide rearward. As the seat moves rearwardly to its final position, a signal is sent via a cable to release the lockout latch. Once the lockout latch releases the swing pin, that pin returns fully to the first end of the arcuate slot.

These and other objects of the invention may be seen more clearly from the drawings and the detailed description of the preferred embodiments that follows.

BRIEF DESCRIPTION OF THE DRAWINGS

FIG. 1a is a schematic view of an exemplary embodiment of the memory seat recline mechanism of the present invention and includes a plan view of some structure of the invention's recline mechanism. FIG. 1b is a sectional view taken through plane 1b—1b in FIG. 1a.

FIG. 2a is a side view of the master side of an exemplary embodiment of the memory seat recline mechanism of the present invention. This view shows the mechanism's attachment to the mechanical lock. FIG. 2b is a sectional view of some of the structural components of the typical mechanical lock used with the present invention.

FIG. 3 is a detailed side view of parts of an exemplary embodiment of the memory seat recline mechanism of the present invention.

In FIG. 9, the memory seat recline system has reclined or dumped the seat, and the seat has been positioned forward. In FIG. 10, the entire seat has moved rearward, and the memory recline mechanism returns the seat to its upright position.

DETAILED DESCRIPTION OF THE PREFERRED EMBODIMENTS

Figure 4:
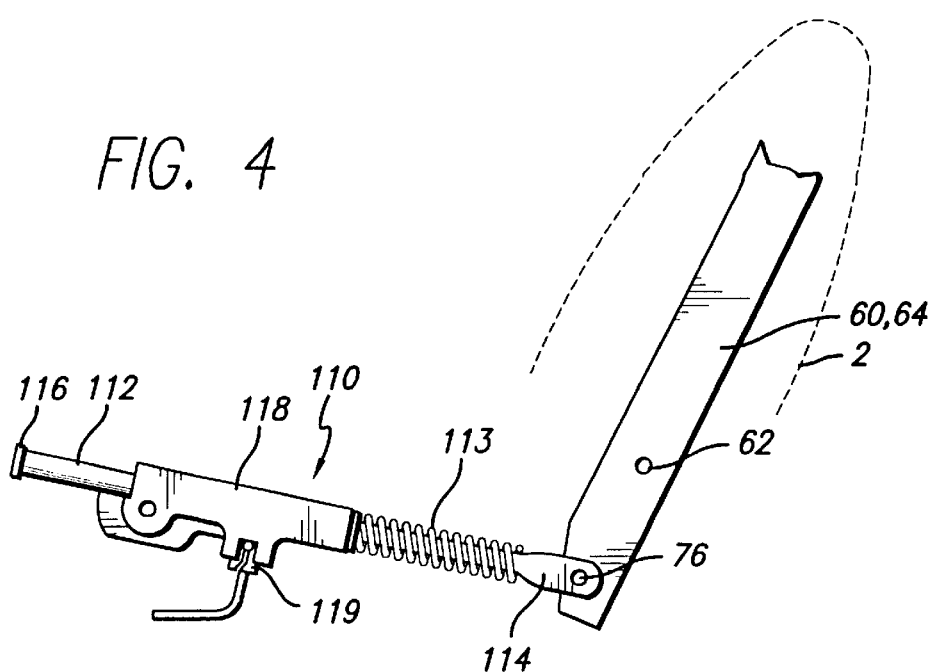
FIG. 4 is a side view of the slave side of the exemplary embodiment of the memory seat recline mechanism of the present invention. This view shows the slave side-of the seat back directly connected to its mechanical lock.

The mechanism of the present invention controls the pivoting and dumping of a seat back in a seat. FIGS. 2 and 4 show seat back 2 in phantom mounted for pivoting with respect to vehicle seat 4. The present invention includes a master unit 6 and a slave unit 8, which FIG. 1 shows. In the first exemplary embodiment, the two units are about 414 mm apart. Of course, sizes, distances and angles can vary depending on the configuration of the vehicle on which the seat and the mechanism are mounted. As explained in more detail below, both the master and the slave units control normal adjustments of the seat back (e.g., clockwise or counterclockwise pivoting for the driver's or passenger's comfort). The slave unit 8 acts during dumping, but only the master unit 6 contains the present invention's memory mechanism.

Figure 8:
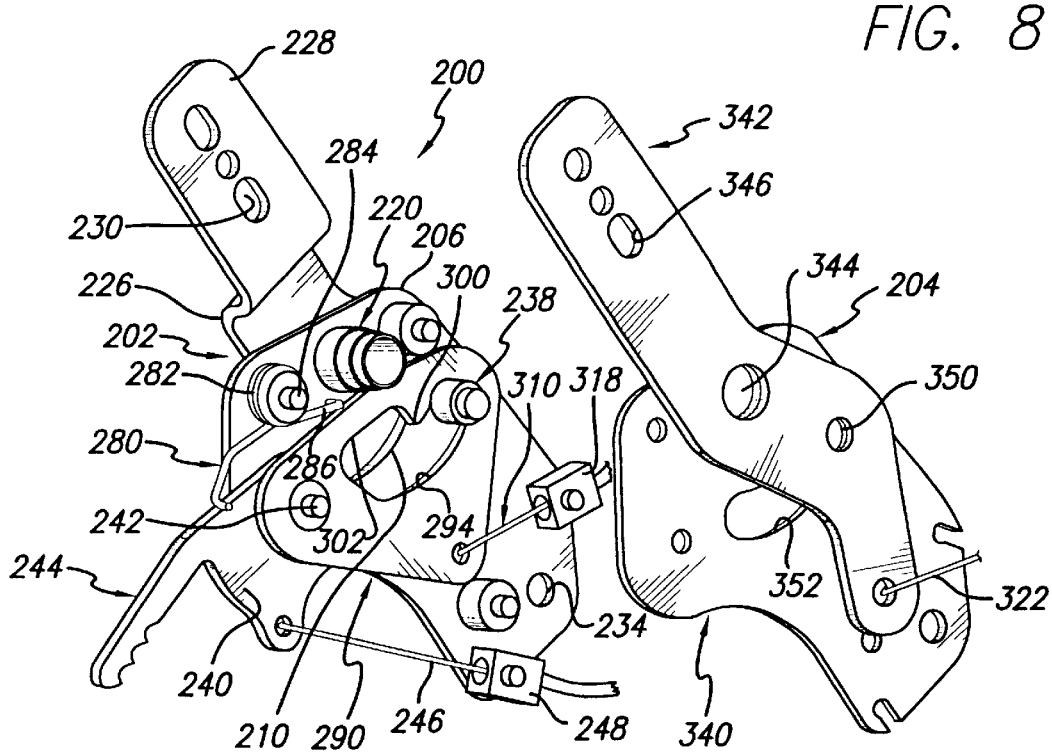
FIG. 8 is a perspective view of another exemplary embodiment of the memory seat recline mechanism of the present invention.
Figure 9:
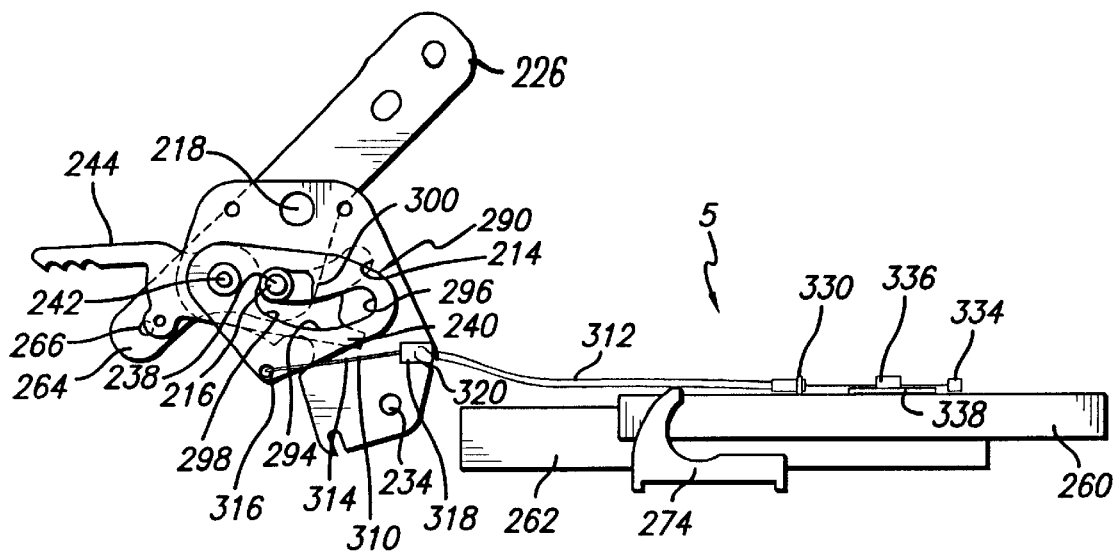
FIGS. 9 and 10 are detailed side views showing the exemplary embodiment of FIG. 8 connected to the seat positioning system.
Figure 10:
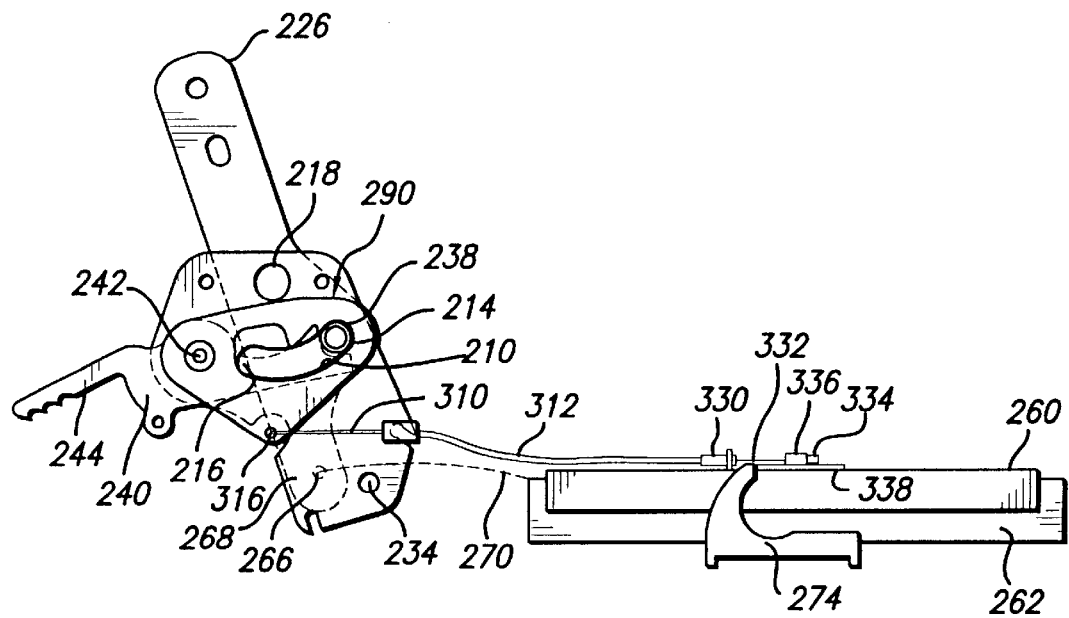

FIGS. 8, 9 and 10 show another embodiment of the pivoting and dumping mechanism 200. It will be described in detail following the description of this first embodiment.

The typical vehicle has two seat controlling and dumping mechanism—sone for the driver's seat and the other for the passenger's seat. Alternatively, only the driver's seat would have the memory mechanism because many drivers require a particular seat back orientation. Passengers may be less particular, and the passenger seat frequently is not occupied. If the vehicle uses two systems, one would normally be a right-hand version and the other is a left-hand version. FIG. 1 is the left-hand version.

Figure 5:
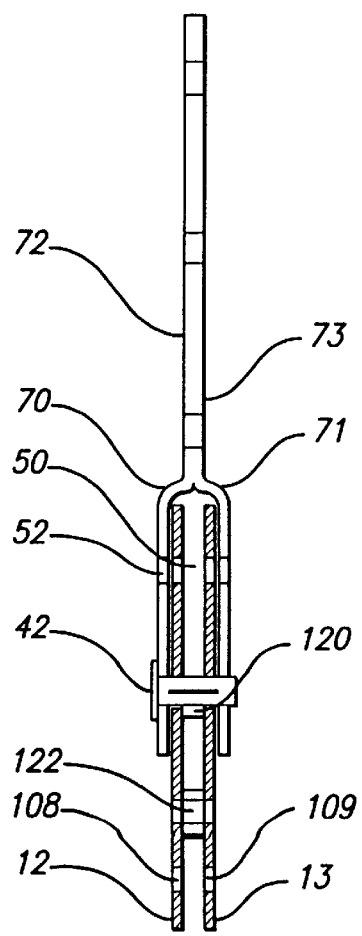
FIG. 5 is a section end view of the master side of an exemplary embodiment of the memory seat recline mechanism of the present invention.

Adjustment mechanism 10 of master unit 6 has a base plate on seat 4 (FIG. 2). The master base plate 12 in the exemplary embodiment is metal for strength. As FIGS. 1 and 5 show, there are two opposing base plates 12 and 13 about 12 mm apart that are mirror images of each other and work together. The remaining discussion often describes only one base plate and the parts associated with the one. The FIGS. 8, 9 and 10 exemplary embodiment does not use two opposing base plates. Instead, it has a single base plate 212.

FIG. 3 shows the first embodiment's master base plate 12 most clearly. It includes a top edge 14. The edge may have recesses 16 to accommodate seat parts or for weight reduction. The front (with respect to the seat) edge 18 is angled to the vertical. The bottom front has a flange 20 that extends down and rearward. Flange 20 ends in two short fingers 22, 23 that form a snap-in feature 24 for installing the relevant cable attachment.

Base plate 12 has an angled bottom wall 26 extending from flange 20 to rounded wall 28. That wall extends to rear wall 30. A small notch 32 near the top of rear wall 30 also is a snap-in feature for installing a cable attachment. Three rivets 34, 36 and 38 (FIG. 3) extend between the opposing master base plates 12 and 13 (FIG. 5). The distance from the top edge to the end of finger 23 is about 120 mm.

Each master base plate 12 and 13 has an arcuate slot with first and second ends. The slot of base plate 13 is optional, however. In this exemplary embodiment, arcuate slot 44 in base plate 12 (FIG. 3) is an arc of a circle, the center of which is at pivot point 50 (see also FIG. 5). The slot extends about 63° from the first or forward end 46 of the slot to the second or rear end 48 (measured from the center of swing pin 42 resting at either end 46 or 48 of the slot). A pivot pin 52 extends through the base plates 12 and 13 at pivot point 50 (FIGS. 3 and 5). The pin's function is explained below.

The master base plates 12 and 13 can pivot together with respect to the vehicle. That pivoting allows the seat back 2 to be adjusted for the driver's or passenger's comfort. A seat plate, which mounts for pivoting on the base plate, connects to the vehicle seat back. The seat plate of the first exemplary embodiment comprises master seat plates 70 and 71 (FIGS. 1 and 5). They will be described in more detail below. Briefly, upper arms 72 and 73 (FIGS. 2 and 5) are about 19 mm apart in the vicinity of the base plates. The upper arms curve together (FIG. 5) and are integral with the rest of seat plates 70 and 71. Mounting holes 74 in the seat plate allow the upper arms to be bolted to the master side of the seat back 2.

The seat plates normally move when the base plates pivot. Therefore, when the base plates 12 and 13 pivot about pin 52, the seat plates 70 and 71 pivot with the base plate. Accordingly, adjusting the angular position of the base plates 12 and 13 about pin 52 sets the angular position of the seat plates 70 and 71 and, therefore, the seat back 2.

One end of a mechanical lock attaches to the base plates at a location spaced from the base plates' pivot (FIG. 2). The lock's other end is fixed on the vehicle. In the exemplary embodiment, mechanical lock 90 may be one of many available mechanical locks. P. L. Porter Co. of Woodland Hills, Calif., sells the preferred lock under the mark MECHLOK, Model Nos. MM 65, MM 85 and others. C. R. Porter, U.S. Pat. No. 5,441,129 (1995), entitled "Precision Linear Mechanical Lock," assigned to P. L. Porter Co., also discloses an acceptable mechanical lock. The mechanical locks are very strong. Not only are they part of the adjustment and dumping mechanism of the present invention, their strength holds the seat back upright during a crash.

The lock has a housing 92 and a rod 94 translating within and extending out of the housing. The housing has an attachment hole 96 for attaching the housing to part of the vehicle. The housing has a mechanism that normally secures the rod to the housing. In the MECHLOK and in the referenced patent, the locking mechanism comprises a pair of coil springs. FIG. 2 partially show one such spring 98. The springs have a normal inside diameter less than the rod's outside diameter. Consequently, the spring normally secures the rod in the housing. 10 When one moves a lever 99 on the housing, spring 98, which connects to the lever, unwinds to increase its inside diameter and release the rod 94.

One end 100 of rod 94 has a flange 102 (FIG. 2). A pin 106 extends through openings in the flange and through opening 108 in the master base plate 12 (FIG. 2). Pin 106 also extends through a corresponding opening in the opposing base plate 13. When one releases lever 99 on the lock's housing 92, rod 94 can translate within the housing. Movement of the rod causes base plates 12 and 13 to pivot about pin 52. Because the seat plates 70 and 71 and seat back 2 pivot with the base plates, releasing the lock 90 allows for seat back pivoting adjustment. Compression spring 110 extends between the housing 92 and flange 102 of the rod to bias the rod to the right (as seen in FIG. 2). This urges base plate 12 counterclockwise and the seat back 2 more upright.

Based on the length of rod 94 and the distance between the base plates' pivot point 50 and opening 108, the seat back in the exemplary embodiment can move from vertical to a 41° recline. Different vehicle configurations and the perceived needs of drivers and passengers allow for different maximum recline angles.

Swing pin 42 mounts on seat plates 70 and 71 and extends through arcuate slot 44 (FIGS. 2 and 3). Part of the swing pin may extend through an arcuate slot of base plate 13 (FIG. 5). When the seat plates 70 and 71 pivot relative to base plates 12 and 13 in a manner described below, the swing pin transverses arcuate slot 44. Note that pin 52 defines a common axis for the seat plates and the base plates.

The memory adjustment and dumping seat mechanism of the present invention also includes a memory latch pivotally mounted on the base plate between a locked and unlocked position. In the exemplary embodiment, FIG. 3 best shows the memory latch 120, but FIG. 5 shows that the latch mounts between base plates 12 and 13. The memory latch mounts on pin 122 which permits it to pivot. The pin extends through openings in base plates 12 and 13.

FIG. 3 shows latch 120 in two positions, latched and unlatched. The memory latch has a latch slot for receiving swing pin 42 when the latch is in its locked position and the swing pin is in the first end 46 of the arcuate slot 44. In FIG. 3, the memory latch's locked position is its most clockwise orientation. In that position, latch slot 124 receives the swing pin and secures it to the first end of the slot. Memory latch 120 pivots about pin 122. Swing pin 42 can travel through 22° to 63° in the arcuate slot. Thus, the arcuate slot acts as a limiting means to limit how far forward the seat back can dump. The pin about which the memory latch pivots is an additional 3° beyond the second end of the slot. This position is advantageous because it ensures that the swing pin will be able to hold latch 120 open before relatching. This feature avoids having the slave lock re-open and return the seat back.

When one pivots memory latch 120 counterclockwise (FIG. 3) in a manner described below, the memory latch releases swing pin 42. Therefore, the swing pin can translate freely within arcuate slot 44. To dump the seat, the user pivots the seat back counterclockwise (forward) after releasing the latch. This causes the swing pin to move to the right (FIG. 2) within the arcuate slot. As explained below, most of the force of dumping comes from the compression spring 113 of the slave mechanical lock 111.

Because of the slot's dimensions, the seat back can dump about 22° forward from vertical. This angle is predetermined and is limited so that the seat back does not strike the steering wheel.

Note that as the seat dumps, mechanical lock 90 remains locked so base plate remains stationary. When the seat back is pivoted back toward its pre-dumping position, the swing pin reaches the first end 46 of the arcuate slot. In that location, the memory latch pivots clockwise so that the latch slot 124 receives the swing pin. Because the base plate has remained stationary while the seat was dumped, the seat back returns to the orientation it had immediately before dumping.

Once latch 120 is unlatched from the swing pin 42 and the swing pin moves to the right in slot 44, the swing pin blocks clockwise rotation of the latch. Therefore, until the seat back returns to its position before dumping, the latch is held in its unlatched position. This is important for the control subsystem described below.

A release attaches to the memory latch for pivoting the memory latch between its locked and unlocked positions. In the exemplary embodiment, the release is a cable 130 attached to fitting 132 on the latch (FIGS. 2 and 3). The fitting is opposite pivot pin 122 from latch slot 124 (FIG. 3). Thus, pulling up on cable 130 pivots latch 120 counterclockwise. One could mount the cable on other places on the latch on either side of pivot pin 122. The cable would pull down if it mounts to the left (FIG. 3) of the pivot pin. Also, a cable is an inexpensive way to pivot the memory latch remotely. One also could use a relay or other electromechanical device to pivot the memory latch remotely. The latch also can be designed to be actuated directly by the operator's foot or hand.

Cable 130 passes through a fitting 134, which attaches to notch 32 on the base plate. The cable then passes to a remote actuator 160 (shown schematically in FIG. 1). A person's activation of the actuator pulls the cable, which, in turn, pivots the memory latch counterclockwise to release the swing pin 42.

A spring may bias the latch to its latched position. In the FIG. 7 embodiment, which is not a preferred one, a helical spring 140, which is in tension, extends between fitting 142 on the latch and fitting 144 on finger 146 of the base plate. The spring biases the memory latch clockwise and urges it to the latched position. The system that has been described in reference to FIGS. 1–6 biases the latch differently.

The slave side 8 of the present invention does not have separate base plates and seat plates. Instead, it has a direct connection between the slave lock 111 and the slave plate 60 which is part of the slave side of seat back 2. Plate 60 pivots on pivot 62 (FIG. 4). The pivot is aligned with pin 52. Therefore, the following elements all pivot about aligned axes: a) the slave plate 60 on the slave side of the seat back 2; b) master base plates 12 and 13; and c) master seat plates 70 and 71. Consequently, the seat back 2 pivots about a single axis. The slave plate 60 may have a series of mounting holes 64 for attaching the slave pivot to structure on the slave side of the seat back.

The mechanical locks 90 and 111 are very similar. Rod 112 of slave-side mechanical lock 111 has a flange 114 that attaches to a pin 76 through the slave plate 60. Thus, when one releases lock 111 and latch 120, the seat back can pivot about pins 52 and 62.

The end 116 of the rod that extends forward of housing 118 (FIG. 4) is longer than the corresponding rod of lock 90. That is because rod 112 of the slave-side mechanical lock 111 must traverse farther during dumping. Remember that during dumping, the master base plates 12 and 13 (FIGS. 1 and 2) remain stationary and mechanical lock 90 remains locked. Consequently, rod 94 does not move during dumping. On the slave side, however, the mechanical lock 112 is unlocked during dumping. Therefore, as seat back 2 pivots counterclockwise beyond the vertical, end 116 of the rod must continue moving to the right (FIG. 4). Accordingly, it must be long enough to transverse the housing fully.

Mechanical lock 111 also has a spring 113 extending between the housing 118 and flange 114 of the rod. The spring is compressed when the seat back reclines (i.e., pivoted clockwise in FIG. 4). In compression, the spring biases the rod to the right (as seen in FIGS. 1 and 4), which urges the seat back counterclockwise or toward the vertical when the seat is reclined back and toward the dumped position during dumping.

Spring 113 is under sufficient pre-compression that even when the seat back is dumped (counterclockwise in FIG. 4), the spring continues acting in compression. As explained below, the compressive force of spring 113 of the slave lock 111 helps seat back 2 dump forward and holds it in the dumped position.

The system of the present invention also has a control subsystem that provides the following operation. When one unlocks the master mechanical lock 90 to adjust the seat back 2, the control subsystem also unlocks the slave lock 111. Consequently, both the base plates 12 and 13 may pivot for adjusting the angle of the seat back. Similarly, when one unlatches latch 120 for dumping the seat, the control subsystem also unlocks the slave lock 111. Master lock 90 remains locked. Therefore, seat plates 70 and 71 may pivot relative to their stationry base plates 12 and 13. Slave plate 60 also can pivot. Therefore, the seat back can dump. Also, once the slave mechanical lock opens and the latch is unlatched for dumping, the slave lock stays unlocked until the latch relatches. When latch 120 is unlatched, the swing pin 42 travels over the surface 126 and blocks the latch from rotating clockwise. That last control function is important because the slave lock cannot lock up when the seat back is dumped. If it did occur, the seat would be locked in the dumped orientation.

In the exemplary embodiment, the control subsystem comprises a latch cable 162 that cooperates with remote dump actuator 160 and latch 120 (FIGS. 1 and 2). Latch cable 162 passes through a fitting 190 (FIG. 3), which mounts in slot 24 on base plate 12. Cable 130, which connects to latch 120, extends to a remote actuator 160 (FIG. 1). The remote actuator may be a button, a mechanical switch or lever. It also could operate electrically. The actuator preferably mounts on the rear of the seat back within reach of a person in the back seat or of a person trying to enter the back seat.

Latch cable 162 extends from remote actuator 160 to a double input/single output ("DISO") mechanism 164 (FIG.

1). The DISO mechanism comprises a housing 166. The housing has a central space 168 that receives a slide block 170. Input cable 162 passes into space 168 and attaches to one wall 172 of the slide block 170. When one throws the remote actuator 160, input cable 162 is pulled to draw slide block toward end wall 174 (in the direction of the arrow in FIG. 1).

Figure 6:
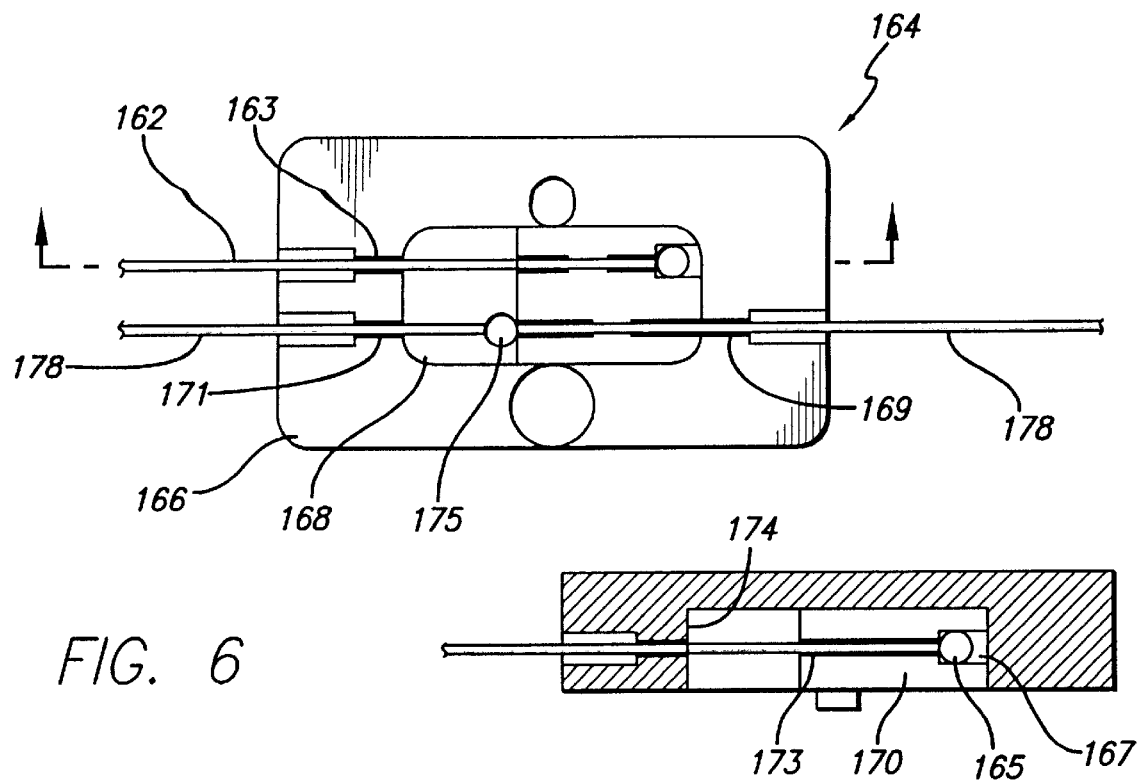
FIG. 6 is a detailed plan view of the double input/single output (DISO) device that is part of the present invention's control subsystem.

Actuator handle 180 is accessible to the driver or passenger sitting in the respective seat. Output cable 178 extends from the actuator handle through passages 169 and 171 in the DISO housing 166 to the lever 119 of slave lock 111 (FIGS. 1, 4 and 6). Cable 178 also passes through a passage 173 in slide block 170. Another small ball 175 attaches to cable 178 at the end of the slide block.

When one actuates remote actuator 160 to unlatch latch 120 to initiate dumping, latch 120 (FIG. 3) pulls input cable 162 to the left in FIG. 3 and in the direction of the arrow in FIGS. 1 and 6. The cable pulls ball 165, which pulls slide block 170 in the arrow's direction. Consequently, the slide block moves ball 175 in the direction of the arrow. The ball, in turn, pulls output cable 178, which pulls lever 119 of the slave lock 111 to unlock the lock. Therefore, unlatching latch 120 simultaneously unlocks the slave lock 111, which releases slave plate 60. Therefore, the seat back 2 can dump.

Another cable 182 extends from handle actuator 180 to the lever 99 of master mechanical lock 90 (FIG. 1). When one actuates handle actuator 180, cable 182 unlocks the master lock. Simultaneously, input cable 178, which extends through DISO 164, pulls the lever 119 of slave mechanical lock 111 to unlock that lock. Therefore, using the handle actuator 180 unlocks master lock 90 and slave lock 111 together. Therefore, the user can adjust the position of the seat back.

When latch 120 is unlatched, swing pin 42 travels over surface 126 and blocks the latch from rotating clockwise. When the lock is in its unlatched orientation (FIG. 3), cable 162 maintains slide block 170 toward end wall 174 (FIG. 6). Consequently, the slide block holds ball 175 toward the end wall. That causes cable 178 to keep the slave mechanical lock unlocked. Therefore, as long as the latch is unlatched, the slave mechanical lock must stay unlocked. Accordingly, when the seat back is dumped, it returns to its upright position without the slave mechanical lock locking. Of course, if the slave lock did lock, the seat back would stay dumped.

When the seat back returns to its pre-dumping position, swing pin 42 returns to the first end 46 of arcuate slot 44. When that occurs, latch 120 can pivot clockwise and recapture the pin. The latch's clockwise rotation releases latch cable 162. That permits slide block 170 to slide in the direction opposite the arrow. The slide block releases cable 178 to release lever 119 of the slave lock. Therefore, when the seat plates 70 and 71 are latched because the seat back is returned to its pre-dumping position, slave lock 111 simultaneously locks.

The control subsystem, therefore, performs the following valuable tasks: a) it simultaneously unlocks the master and slave locks when the seat is adjusted; b) it simultaneously unlatches the seat plate and unlocks the slave lock when the seat is dumped; 3) it simultaneously locks the slave lock when the latch recaptures the swing pin; and 4) it prevents the slave lock from locking as long as the dumping mechanism is dumping the seat.

The previously described exemplary embodiment dealt only with having memory for seat dumping. The next embodiment still uses the seat back memory used when the entire seat slides forward during dumping. The dumping memory prevents the seat back from reaching its upright position until the entire seat is slid back to its proper position.

Referring to FIG. 8, pivoting and dumping mechanism 200 comprises a master unit 202 and a slave unit 204. The master unit 202 includes a base plate 206, which mounts on a vehicle seat 5. The master base plate 206 is preferably metal in the exemplary embodiment. The first exemplary embodiment has two opposing base plates (see FIGS. 1 and 5) that are mirror images of each other. This second exemplary embodiment (FIG. 8) uses a single base plate 206. Having one or two base plates is a matter of choice.

The master base plate 206 has an arcuate slot 210 (FIGS. 8, 9 and 10) with first and second ends 214 and 216. As in the first exemplary embodiment, arcuate slot 210 in the second exemplary embodiment is an arc of a circle, the center of which is at pivot point 218. A seat back pivot bushing 220 (FIG. 8) projects outward from base plate 206 at the pivot point 218.

The master base plate 206 pivots with respect to the vehicle. That pivoting allows the seat back 2 (shown in phantom in FIG. 2) to be adjusted for the driver's or passenger's comfort. A seat plate, which mounts for pivoting on the base plate, connects to the vehicle seat back. The master seat plate 226 (FIGS. 8, 9 and 10) of this exemplary embodiment has an upper arm 228 that is offset inwardly from the rest of seat plat 226 (FIG. 8). The upper arm bolts to the master side of the seat back through mounting holes 230 in the seat plate's upper arm.

The seat plate normally moves with the base plate as the latter pivots. Therefore, when the base plate 206 pivots about axis 218, the seat plate 226 pivots with the base plate. Accordingly, adjusting the base plate's angular position about pin 218 sets the seat plate's and, therefore, the seat back's angular position. Note that point 218 defines a common axis for both the seat plate 226 and the base plate 206.

As in the first exemplary embodiment, one end of a mechanical lock (not shown) is fixed on the vehicle and the lock's other end attaches to the base plate at a location spaced from the base plate's pivot 218. Because the description of the first exemplary embodiment describes the mechanical lock/base plate interaction, it is not explained again here. Opening 234 on the base plate (FIGS. 8, 9 and 10) provides a means for attaching the mechanical lock to the base plate.

When one releases a lever associated with the lock, the lock allows base plate 206 to pivot about point 218. The seat plate 226 and seat back pivot with the base plate. Therefore, when the lock releases the base plate, one can pivot and adjust the seat back.

Swing pin 238 mounts on seat plate 226 and extends through arcuate slot 210 in base plate 206 (FIGS. 8, 9 and 10). When the seat plate 226 pivots relative to base plate 206, the swing pin 238 transverses arcuate slot 210.

This second exemplary embodiment has a memory latch and a lockout latch. Turning to the former first, the memory latch 240 mounts on pin 242 which permits it to pivot. The pin extends through an opening in base plate 206. In the first exemplary embodiment, a remote handle connected by a cable to the memory latch pivots the latch. In this embodiment, a handle 244 projects from the memory latch, which allows one to pivot the memory latch directly. Of course, with proper fittings, the memory latch can be pivoted through a remote handle. Likewise, the first embodiment's memory latch could have a handle for direct activation.

Figure 7:
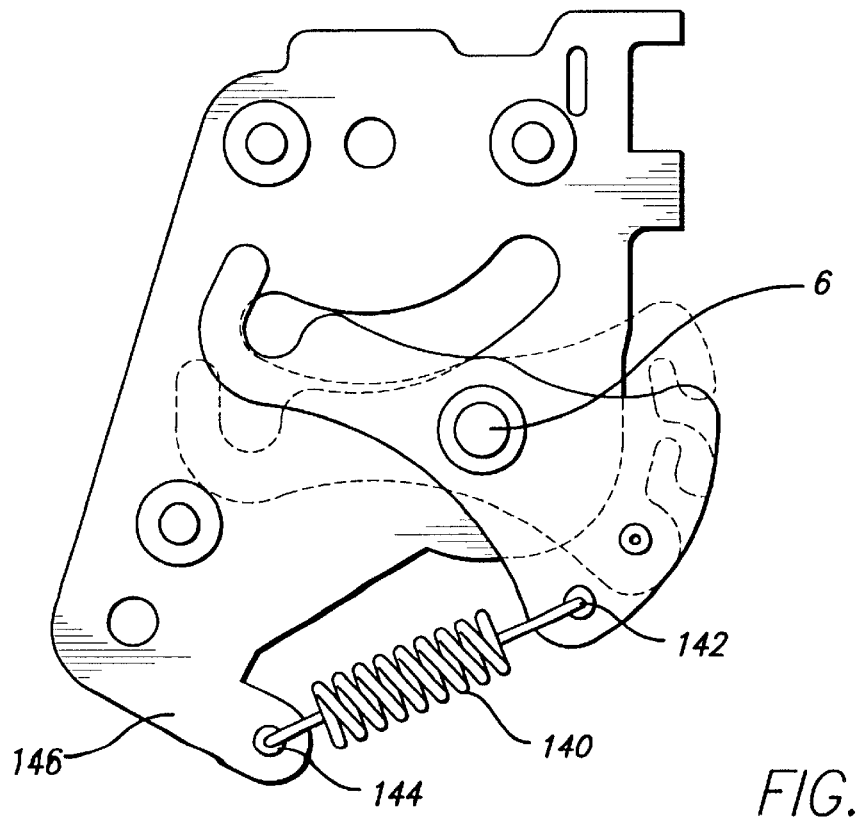
FIG. 7 is a detailed side view of parts of another exemplary embodiment of the master side of the memory seat recline mechanism of the present invention.

The memory latch 240 has a latched and an unlatched position. They are not clearly shown in FIGS. 8, 9 and 10. However, FIGS. 2, 3 and 7 show the memory latch's positions in the first embodiment, and the memory latch in the second embodiment works in the same way. Thus, the memory latch has a latch slot that receives swing pin 238 when the latch is in its locked position and the swing pin is in the first end 214 of the arcuate slot 210.

To dump the seat back, one lifts handle 244 to pivot memory latch 240 clockwise. One leg 280 of a torsion spring 282 biases memory latch 240 counterclockwise. Thus, lifting the handle 244 overcomes the force of spring leg 280. Pivoting the memory latch releases swing pin 238. Since the swing pin is not trapped, it can translate freely within arcuate slot 210. As with the first embodiment, a compression spring of the slave mechanical lock provides most of the dumping force on the seat back.

As with the first exemplary embodiment, the slave side 204 is much less complex than the master side 202 (FIG. 8). A housing 340 mounts on the seat, and a slave-side seat plate 342 pivots about pivot point 344. Pivots 344 (slave side) and 218 (master side) are aligned with each other on the seat. A guide pin (not shown) may mount at opening 350 on seat plate 342 and extend into slot 352 on the housing to guide the pivoting of the seat plate.

In this embodiment, the slave side mechanical lock (not shown) connects to the housing 340. When the control system releases the slave side mechanical lock, the seat plate 342 and housing 340 pivot together. When the seat returns from the dumped orientation, the pin within slot 352 returns the housing 340 to its original position.

Seat 5 (FIG. 9) moves forward as the seat back dumps. As is common, the seat attaches to an upper track 260. The upper track slides along a lower track 262. The lower track is fixed to the vehicle. These track mechanisms are well known. Two such sets of tracks are common for most vehicle seats. FIGS. 9 and 10 only show one set of tracks, the set associated with the master-side 202. A second set of tracts, which the slave side 204 controls is spaced from the first set of tracks. Furthermore, the master side 202 controls the first set, which the drawings show. The slave side controls the set of tracks that the drawings do not show. The upper track usually has teeth that grip the lower track to secure the tracks together. To adjust the seat backward or forward, the user customarily lifts a handle in the front-bottom of the seat. A connection between the handle and the teeth can release the teeth that normally lock the upper and lower tracks together.

A cable 270 (FIGS. 9 and 10), which is shown schematically, extends to the tracks from a fitting (not shown) mounted at opening 266 on the lower portion of seat plate 226. The cable's connection to the tracks is such that pulling the cable releases the track teeth. When the user dumps the seat, the seat plate rotates clockwise (FIGS. 8 and 9). Consequently, the fitting at opening 266 pulls cable 270, which releases the track teeth. Therefore, as the seat dumps, the teeth release the track, and the seat can move backward and forward. Springs bias most seats forward. Therefore, when the dumping action releases the seat tracks, the seat moves all the way forward.

The present invention is used with a device that provides memory for the front and back position of the seat. The device positions a memory marker 274 in a position corresponding to the seat's adjusted forward or rearward position. A connection between memory marker 274 and the handle connected to the seat tracks allows the memory marker to move along the lower track 260 as the seat is positioned. Releasing the handle sets the memory marker's position.

As the seat dumps, the mechanical lock attached to the base plate 206 remains locked so base plate remains stationary. When one pivots the seat back toward its pre-dumping position, the swing pin moves toward the first end 216 of the arcuate slot 210.

Once memory latch 240 is unlatched from the swing pin 238 and the swing pin moves to the second end 216 in slot 210, the swing pin blocks and keeps the latch in its unlatched position. The memory latch 240 can pivot clockwise to re-engage the swing pin 238 only when the seat back is in its full, upright position. Thus, if a user stops pushing the seat back to the full, upright position before the memory latch relatches, the seat back will dump forward again.

The spring force pushing the entire seat forward is usually greater than the spring force dumping the seat back. Consequently, overcoming the force of dumping takes less force than moving the seat rearward. Therefore, applying a return force to the seat back would return it to its upright position before the entire seat returns to its locked rearward, memory position. The seat occupant then could sit in what appears to be a normal, locked seat, but the seat may not be locked on the track against forward movement. However, the present invention prevents the seat back from locking in its upright position until the swing pin 238 moves to the first end 214 of arcuate slot 210, which allows the memory latch 240 to re-engage the swing pin 238. The seat back only locks in its upright, memory position when the memory latch engages the swing pin. Therefore, preventing this engagement until the entire seat is in its rearward, locked memory position can solve the problem of the seat back locking in its upright position while the seat track is not locked.

The present invention has a lockout latch moveable between two positions. In a first position, the lockout latch blocks the swing pin from reaching the first end of the arcuate slot to be reattached by the memory latch. When the lockout latch moves to its second position, it allows the swing pin to travel to the first end of the arcuate slot and to be reattached by the memory latch. The lockout latch only moves to its second position when the seat slides all the way to its locked, rearward memory position.

In this exemplary embodiment, lockout latch 290 mounts for pivoting on pin 242 (FIG. 8). The lockout latch is a triangularly-shaped, metal plate in the exemplary embodiment. While metal is the preferred material, plastic or other materials could work in some environments. Other shapes also are possible. The triangular shape of the present invention's second embodiment works well with the attachment points, the cables attached to the lockout latch and with the memory latch. A slot 294 with first and second ends 296 and 298 extends through the lockout latch, and the swing pin 238 extends through the lockout latch slot.

The lockout latch slot 294 has two regions. The first region is nearer the first end 296 of the slot; the second region is near the slot's second end 298. When swing pin 238 is in the first region of the lockout latch slot (FIG. 10), the swing pin also is at the first end 214 of the arcuate slot 210 of the memory latch 240. With the swing pin in this position, the memory latch is in its latched position. The swing pin 238 is in the lockout latch slot's second region (FIG. 9) when the seat back is dumped. Then, the swing pin also is in the arcuate slot's second end. With the swing pin in this position, the memory latch is unlatched.

The lockout latch slot has a blocking element that prevents the swing pin from moving to the first end of the arcuate slot and into the first region of the lockout latch slot. In this exemplary embodiment, the blocking element comprises a tooth-like projection 300 that projects downward from the top of lockout latch slot 294. As FIG. 9 shows, projection 300 blocks movement to the right toward the first end 214 of the arcuate slot and the lockout latch slot's first end 296. The second leg 286 of torsion spring 282 (FIG. 8) urges the lockout latch clockwise, which biases the top surface 302 of lockout latch slot 294 against swing pin 238. Therefore, the swing pin 238 normally will not push the lockout latch and the blocking member out of the way to return to the first region. Bushing 220 also acts as a stop to limit the lockout latch's maximum pivoting. Further, as FIG. 9 shows, the swing pin also is entrained within arcuate slot 210. In FIG. 9, the dumped position, the blocking member prevents the swing pin from reaching the respective first ends of the arcuate and lockout latch slots.

In this exemplary embodiment, the blocking element projects into a relatively wide lockout latch slot 294, and the latch itself pivots to provide enough space for the swing pin to move to the slot's first region. Other arrangements are possible. For example, the blocking element could be a movable tooth projecting into the latch slot. In such an arrangement, the device would not require a pivoting lockout latch. Those of ordinary skill will appreciate other constructions and other ways to control the blocking element.

When the user raises the handle 244 on the memory latch 240, the lockout latch pivots clockwise through a small arc. See FIG. 9. When the seat back is fully dumped, the swing pin is at the second end of the lockout latch slot. As the seat plate 226 rotates counterclockwise, the swing pin contacts the blocking member 300. Since the blocking member will not move out of the path of the swing pin, continued force on the seat back does not raise the seat back all the way to the final memory position. Instead, the force on the seat back moves the seat backward along the tracks.

The present invention senses when the entire seat returns to the memory position. Only then, does the lockout latch pivot counterclockwise to remove the blocking member from the swing pin's path. With the seat in is rearward, memory position, it is safe to return the seat back to its memory position. Accordingly, once the seat slides to its locked, rearward position, further force on the seat back causes the seat back to pivot toward its upright memory orientation. A lockout latch actuator extending between the adjusting track and the lockout latch senses the return of the entire seat to its rearward position.

In the exemplary embodiment, the lockout latch actuator comprises a lockout latch cable 310, which extends through a protective sheath 312. One end 314 of the cable attaches to a fitting 316 on the bottom apex of the lockout latch. A slide fitting 318 mounts in an indentation 320 on base plate 206. The sheath attaches to the slide fitting, and the cable slides within the slide fitting. The other end 332 of cable 310 passes through a slide fitting 330 that is fixed to track 260. The cable has an end cap 334, which is fixed to the cable. The cable also passes through a lost motion clip 336, which mounts on the upper track 260. Cable 322 extends from the slave-side seat plate 342 to its set of tracks.

FIG. 9 shows the seat 5 in its farthest position forward. As the user pushes the seat rearward after it is dumped, a cam 338 on the upper track 260 contacts the memory marker 274. See FIG. 10. When that occurs, the cam acts on the end 334 of the cable to pull the cable to the right. The first end 314 of the cable pulls the lockout latch and rotates it slightly against the spring force of torsion spring 282. The force from the cable is sufficient to move the blocking member 300 out of the swing pin's way. When that occurs, the swing pin can move to the first region of the lockout latch slot and to the first end of the arcuate slot. Accordingly, once the entire seat returns to its memory position, then, and only then, does the mechanism allow the seat back return to its normal position.

Though the second exemplary embodiment uses a handle 244 for releasing the memory latch 240, a release lever in the first embodiment attaches to the memory latch for pivoting the memory latch between its locked and unlocked positions. In the exemplary embodiment, the release is a cable 130 attached to fitting 132 on the latch (FIGS. 2 and 3). The fitting is opposite pivot pin 122 from latch slot 124 (FIG. 3). Thus, pulling up on cable 130 pivots latch 240 counterclockwise. One could mount the cable on other places on the latch on either side of pivot pin 122. The cable would pull down if it mounts to the left (FIG. 3) of the pivot pin. Also, a cable is an inexpensive way to pivot the memory latch remotely. One also could use a relay or other electromechanical device to pivot the memory latch remotely. The latch also can be designed to be actuated directly by the operator's foot or hand.

Cable 130 passes through a fitting 134, which attaches to notch 32 on the base plate. The cable then passes to a remote actuator 160 (shown schematically in FIG. 1). A person's activation of the actuator pulls the cable, which, in turn, pivots the memory latch counterclockwise to release the swing pin 42.

A spring may bias the latch to its latched position. In the FIG. 7 embodiment, which is not a preferred one, a helical spring 140, which is in tension, extends between fitting 142 on the latch and fitting 144 on finger 146 of the base plate. The spring biases the memory latch clockwise and urges it to the latched position. The system that has been described in reference to FIGS. 1–6 biases the latch differently.

The slave side 8 of the present invention's first exemplary embodiment, does not have separate base plate and seat plates. Instead, it has a direct connection between the slave lock 111 and the slave plate 60 which is part of the slave side of seat back 2. Plate 60 pivots on pivot 62 (FIG. 4). The pivot is aligned with pin 52. Therefore, the following elements all pivot about aligned axes: a) the slave plate 60 on the slave side of the seat back 2; b) master base plate 12 and 13; and c) master seat plates 70 and 71. Consequently, the seat back 2 pivots about a single axis. The slave plate 60 may have a series of mounting holes 64 for attaching the slave pivot to structure on the slave side of the seat back.

The mechanical locks 90 and 111 are very similar. Rod 112 of slave-side mechanical lock 111 has a flange 114 that attaches to a pin 76 through the slave plate 60. Thus, when one releases lock 111 and latch 240, the seat back can pivot about pins 52 and 62.

The end 116 of the rod that extends forward of housing 118 (FIG. 4) is longer than the corresponding rod of lock 90. That is because rod 112 of the slave-side mechanical lock 111 must traverse farther during dumping. Remember that during dumping, the master base plate 12 and 13 (FIGS. 1 and 2) remain stationary and mechanical lock 90 remains locked. Consequently, rod 94 does not move during dumping. On the slave side, however, the mechanical lock 112 is unlocked during dumping. Therefore, as seat back 2 pivots counterclockwise beyond the vertical, end 116 of the rod must continue moving to the right (FIG. 4). Accordingly, it must be long enough to transverse the housing fully.

Mechanical lock 111 also has a spring 113 extending between the housing 118 and flange 114 of the rod. The spring is compressed when the seat back reclines (i.e. pivoted clockwise in FIG. 4). In compression, the spring biases the rod to the right (as seen in FIGS. 1 and 4), which urges the seat back counterclockwise or toward the vertical when the seat is reclined back and toward the dumped position during dumping.

The system controlling the FIGS. 8, 9 and 10 exemplary embodiment is similar to the one controlling the first exemplary embodiment. Therefore, it is neither explained nor shown in detail with this embodiment. FIG. 8, however, shows part of cable 246, which attaches to handle 244. The cable passes through a slide fitting 248 on the master plate 206 and attaches to the DISO (not shown). It operates similarly to the operation of cable 162 in FIG. 3. Note, however, that cable 162 moves in response to movement of the memory latch 120. In the second embodiment, the cable attaches to the lockout latch 290. Of course, the memory latch 206 determines the lockout latch's movement.

Many modifications and alternate embodiments will occur to those skilled in the art. Therefore, the applicant intends that the invention is limited only in terms of the appended claims.

I claim:

1. A mechanism for controlling reclining and dumping of a seat back of a seat wherein the seat is mounted for lateral movement along an adjusting track, the mechanism comprising:

a base plate attachable to a seat and pivotable with respect to ground, the base plate having an arcuate slot with first and second ends;

a lock attached to the base plate, the lock having a locked condition preventing the base plate from pivoting and an unlocked condition permitting the base plate to pivot;

a seat plate connectable to the a seat and pivotally mounted on the base plate, the seat plate having a swing pin sliding within the arcuate slot;

a memory latch mounted on the base plate for pivoting between a latched and unlatched position, the memory latch having a memory latch slot receiving the swing pin when the memory latch is in its latched position and the swing pin is in the first end of the arcuate slot;

a release attached to the memory latch for pivoting the memory latch between its latched and unlatched positions;

a lockout latch attached to the memory latch, the lockout latch comprising a lockout latch slot having first and second ends, the swing pin extending into the lockout latch slot, the lockout latch slot having two regions, wherein when the swing pin is in the first region, the swing pin is in the first end of the arcuate slot of the base plate and the memory latch is in its latched position, a blocking element in the lockout latch slot preventing the swing pin from moving to the first end of the arcuate slot and into the first region of the lockout latch slot, the lockout latch being biased to a position in which the blocking element prevents the swing pin from moving to the first end of the arcuate slot;

a lockout latch actuator extending between the adjusting track and the lockout latch, wherein when the seat moves to a predetermined position in the adjusting track, the lockout latch actuator moving the blocking element from its position preventing the swing pin from moving to the first end of the arcuate slot to a position permitting the swing pin to move to the first end of the arcuate slot and into the first region of the lockout latch slot.

2. The mechanism of claim 1 wherein the blocking member comprises a surface on the memory latch, the surface intersecting the swing pin when the swing pin is away from the first end of the arcuate slot.

3. The mechanism of claim 1 wherein the lockout latch pivots on the memory latch.

4. The mechanism of claim 1 further comprising a spring on the base plate and extending to the lockout latch and the memory latch to urge the memory latch to its latched position.

5. The mechanism of claim 1 further comprising a spring on the base plate and extending to the lockout latch to urge the blocking member into a position blocking the swing pin from returning to the first end of the arcuate slot.

6. The mechanism of claim 1 further comprising a bushing on the base plate extending adjacent the lockout latch for limiting the pivoting of the lockout latch.

7. The mechanism of claim 1 wherein the blocking member is a tooth in the lockout latch slot.

8. The mechanism of claim 1 wherein the release comprises a cable extending between the adjusting track and the lockout latch.

9. A mechanism for allowing pivoting and dumping of a seat back relative to a seat and for controlling the return of the seat back to its upright position depending on the position of the seat, the mechanism comprising:

a base plate;

locking means attached to and spaced from the base plate having a locked condition for preventing the base plate from pivoting and an unlocked condition for allowing the base plate to pivot;

seat plate means pivoting on the base plate and attached to the seat back for pivoting the seat back with respect to the base plate;

limiting means on the base plate and receiving a portion of the seat plate means, the portion movable within the limiting means;

memory latching means on the base plate and pivoting between a latched position against the portion of the seat plate means and a dumping position releasing the portion of the seat plate, the memory latching means in its latched position blocking movement of the portion of the seat plate means relative to the base plate, and the memory latching means in its dumped position permitting movement of the portion of the seat plate means relative to the base plate; and lockout means operably connected to the memory latching means for blocking movement of the memory latching means to the latched position until the seat is in a predetermined position.

10. The mechanism of claim 9 wherein the lockout means comprises a lockout latch attached to the memory latching means, the lockout latch having a slot, and blocking means on the lockout means for blocking a portion of the seat plate means until the seat is in the predetermined position.

11. In a method for controlling the adjustment and dumping of a seat back in which the seat has a pivoting seat back and for controlling the adjustment and position of the seat, the seat having a base plate and a seat plate mounted for pivoting with respect to the seat plate;

fixing the orientation of the seat plate relative to the base plate;

pivoting the base plate to pivot the seat plate to a memory position;

unlatching the seat plate from the base plate to dump the seat back and releasing the seat to change the position of the seat from a chosen position to a forward position;

blocking the seat back from returning to its memory position until the seat returns to its forward position.

* * * * *